US005673285A

United States Patent [19]
Wittle et al.

[11] Patent Number: 5,673,285
[45] Date of Patent: Sep. 30, 1997

[54] CONCENTRIC ELECTRODE DC ARC SYSTEMS AND THEIR USE IN PROCESSING WASTE MATERIALS

[75] Inventors: J. Kenneth Wittle, Chester Springs; Richard A. Hamilton, Aston; Charles S. Titus, Newtown Square, all of Pa.

[73] Assignee: Electro-Pyrolysis, Inc., Wayne, Pa.

[21] Appl. No.: 266,209

[22] Filed: Jun. 27, 1994

[51] Int. Cl.$^6$ ............................................. F27D 3/00
[52] U.S. Cl. ............................... 373/82; 373/79; 373/69
[58] Field of Search .............................. 373/82, 79, 81, 373/91, 92, 94, 52, 69; 219/121.52

[56] References Cited

U.S. PATENT DOCUMENTS

| | | |
|---|---|---|
| 3,147,331 | 9/1964 | Brugger. |
| 3,293,863 | 12/1966 | Cox et al.. |
| 3,546,348 | 12/1970 | DeCorso .................... 373/82 |
| 3,585,269 | 6/1971 | Krause ....................... 373/82 |
| 3,812,620 | 5/1974 | Titus et al.. |
| 4,039,738 | 8/1977 | Beskin et al. ............... 373/82 |
| 4,376,598 | 3/1983 | Brouns et al.. |
| 4,431,612 | 2/1984 | Bell et al.. |
| 4,461,010 | 7/1984 | Titus. |
| 4,495,625 | 1/1985 | Heberlein et al.. |
| 4,495,990 | 1/1985 | Titus et al.. |
| 4,776,409 | 10/1988 | Manchak, Jr.. |
| 5,004,373 | 4/1991 | Carter. |
| 5,011,329 | 4/1991 | Nelson et al.. |
| 5,100,259 | 3/1992 | Buelt et al.. |
| 5,138,629 | 8/1992 | Maki et al.. |
| 5,138,630 | 8/1992 | Suga. |
| 5,181,795 | 1/1993 | Circeo, Jr. et al.. |
| 5,181,797 | 1/1993 | Circeo, Jr. et al.. |
| 5,189,682 | 2/1993 | Maki et al.. |
| 5,276,253 | 1/1994 | Circeo, Jr. et al.. |
| 5,467,366 | 11/1995 | Wilhelmi et al. ............. 373/85 |

OTHER PUBLICATIONS

Surma et al., "Graphite Electrode DC Arc Technology Development for Treatment of Buried Wastes", Incineration Confernece '93, May 3–7, 1993, pp. 453–456.

Wittle et al., "DC Graphite Arc Furnace and Diagnostic System for Soils", Third Int. Conf. Toxic Combination By-Products, Jun. 14–16, 1993.

Plasma Technology in Metallurgical Processing, Feinman et al., eds., The AIME Iron & Steel Society, 1987, pp. 65–79, 103–109.

Surma et al., "Graphite Electrode DC Arc Technology Development for Treatment of Buried Wastes", Pacific Northwest Laboratory, report #PNL-SA-2181.

*Primary Examiner*—Tu B. Hoang
*Attorney, Agent, or Firm*—Dann, Dorfman, Herrell and Skillman, P.C.

[57] ABSTRACT

An electrode assembly comprising concentric tubular electrodes is provided for high temperature processing of materials. The electrode assembly is connected with a power supply that includes switching means for alternatively operating the electrode assembly in a transferred mode of operation, in a non-transferred mode of operation, or according to a controlled sequence of non-transferred and transferred modes of operation. The power supply system includes variable inductors, such as leakage-coupled reactors, for controlling the electrical power supplied to the electrodes for producing a DC arc. The electrode assembly can be incorporated into an arc furnace for processing waste material in the furnace. The electrode assembly is also suitable for use in the practice of in-situ vitrification and remediation of contaminated soil. During in-situ vitrification, the electrode assembly may also be operated in the non-transferred mode, while being withdrawn from holes in the earth, to produce vitrified columns of soil. The vitrified columns of soil can be coalesced with similar adjacent columns of soil in order to form a composite or unitary subterranean mass or barrier for contaminated material in a selected area. Multiple electrode assemblies can be employed to treat contamination located within a large area. An AC potential can be applied to adjacent electrode assemblies in order to promote coalescence of the adjacent columns of treated soil to form a composite or unitary mass.

25 Claims, 9 Drawing Sheets

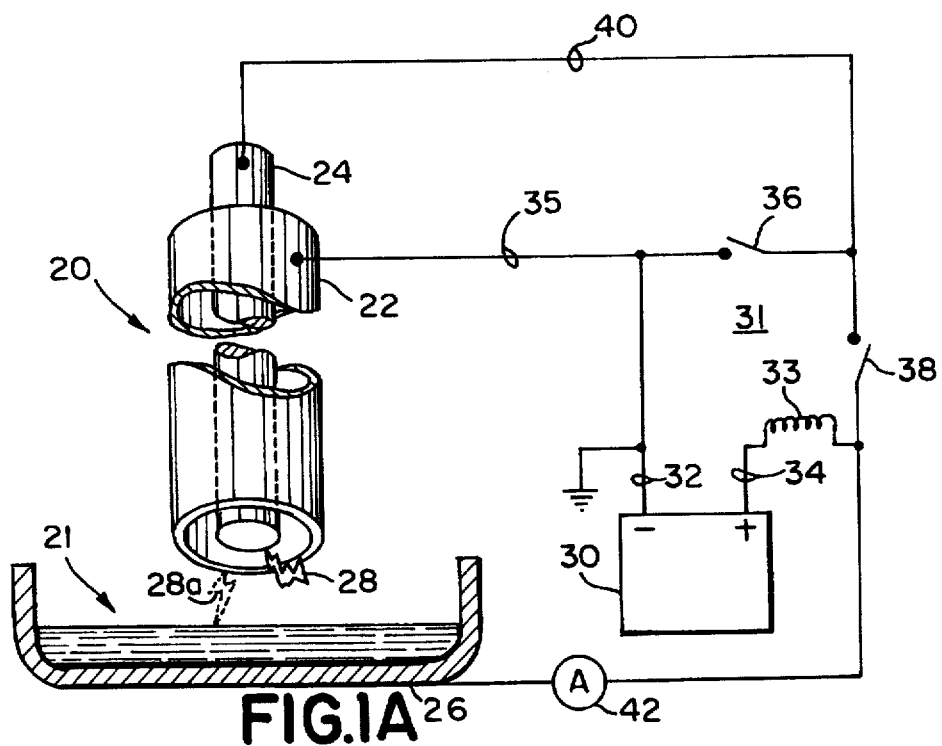
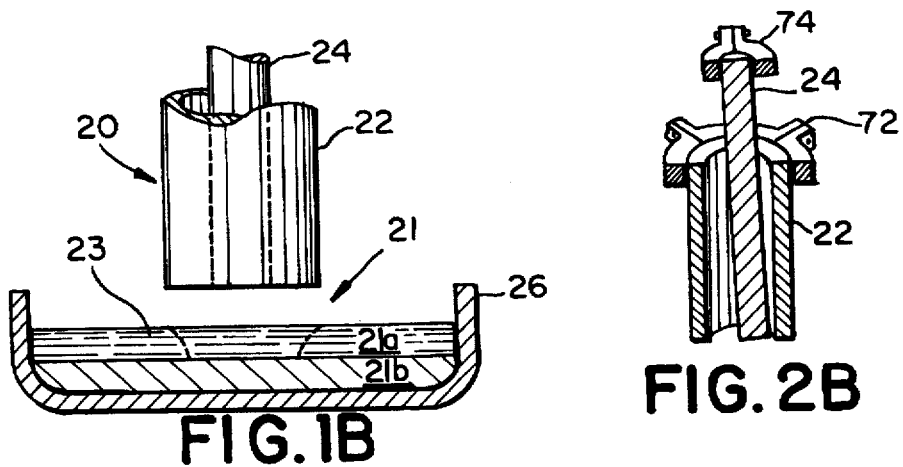
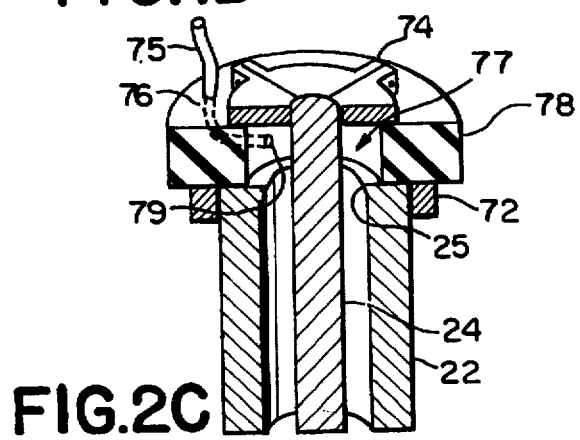
FIG.1A
FIG.1B
FIG.2B
FIG.2C

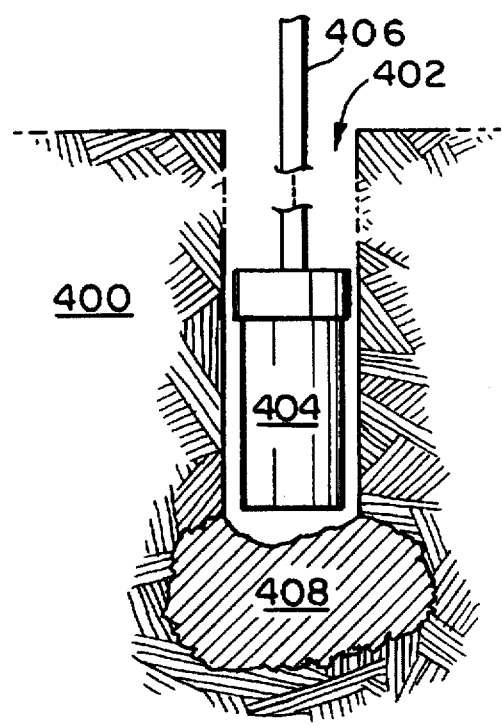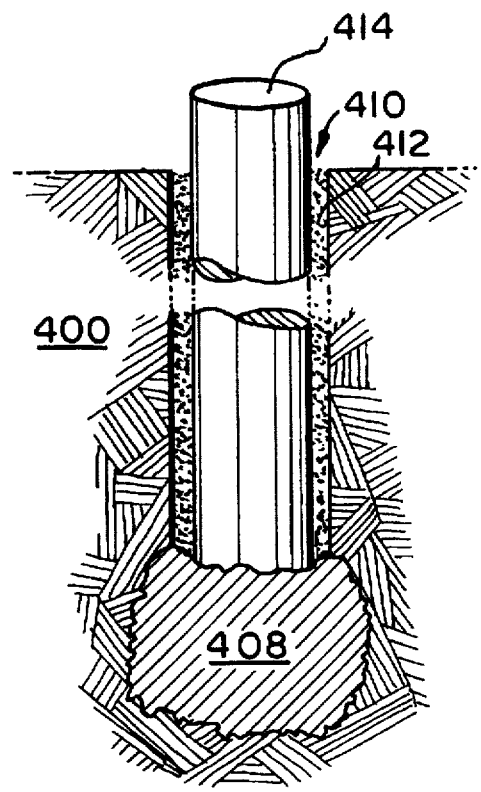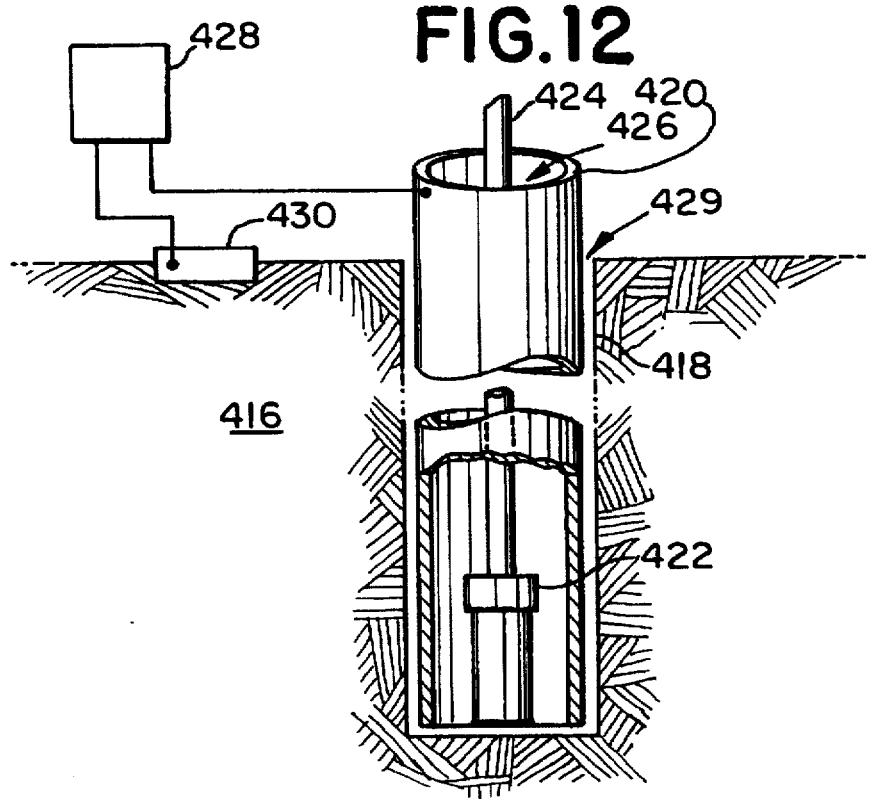

CONCENTRIC ELECTRODE DC ARC SYSTEMS AND THEIR USE IN PROCESSING WASTE MATERIALS

FIELD OF THE INVENTION

The present invention relates to systems for high temperature processing of materials. In particular, the invention relates to an electrode apparatus and associated systems for operating the electrode apparatus to process waste materials with a DC arc.

BACKGROUND OF THE INVENTION

The safe disposal of waste materials, particularly hazardous waste materials, is an area of increasing social concern. The manifold benefits of advances in chemistry, medicine, and nuclear technology have been accompanied by the accumulation of large quantities of toxic, infectious and/or radioactive waste materials as well as otherwise inert materials which have been contaminated by such undesirable agents. In some areas, subterranean contamination of the soil by such agents threatens the safety of underground water supplies and other natural resources.

DC arc furnaces have been employed to melt ferrous metals. The use of such furnaces to process waste materials offers several advantages in the disposal of such materials relative to other available disposal technologies such as incineration. These advantages include the ability to separate and recover useful materials from the waste, reduced gaseous emissions, and a more complete breakdown of the waste material into non-hazardous components or into pure elements. Such advantages are described in U.S. Pat. No. 4,431,612 issued Feb. 14, 1984 and in U.S. Pat. No. 3,812,620 issued May 28, 1974, both of which are incorporated by reference herein.

Several of the particular advantages described in the aforementioned patents result from the effects of a DC plasma or arc that is rooted at one end to an electrode and at the other end to a conductive pool of molten material within a conductive hearth. Such an electric arc is referred to as a "transferred" arc, in that, electrical current is transferred between the electrode assembly and the waste material. Another known type of DC arc processing utilizes a "non-transferred" arc wherein an arc is established between two electrodes in the vicinity of the material to be treated so that thermal energy is transferred from the arc to the material primarily by radiation. A transferred arc provides more effective transfer of thermal energy to the waste material and enhanced chemical breakdown of the waste material relative to a non-transferred arc.

In order to establish a transferred arc in accordance with the known methods, it is necessary either (i) to establish a conductive molten pool or "heel" within the hearth prior to adding waste materials to the hearth or (ii) to limit the use of such apparatus to the treatment of waste materials having a sufficient bulk conductivity to establish arcing between the electrode and the conductive material in the pool. The requirement of initially forming a conductive layer in the pool prior to adding heterogeneous waste material can cause difficulties in practice, particularly if the furnace is operated on a batch basis. The alternative requirement of restricting the use of a DC arc to the treatment of electrically conductive waste materials severely limits the usefulness of DC arc processing of waste since many waste materials are not sufficiently conductive to establish a transferred DC arc.

It would be desirable to provide a waste treatment system capable of treating a wide range of waste materials using a transferred DC arc regardless of the electric conductivity of such materials. It would also be desirable to provide such a system in which it is not necessary to form a conductive pool within a hearth prior to the addition of such waste materials. In the processing of material on a batch basis, it would be desirable to provide a system in which it is not necessary to remove any non-conductive surface layer(s) after processing each batch.

A more fundamental limitation of prior systems for destroying waste material in an arc furnace is that such materials must be transported from their respective sites of origin to the furnace in order to be processed. In order to remediate contamination at certain remote sites, it would be prohibitively expensive, hazardous, and/or otherwise impractical to remove the waste material from the contaminated site for transportation to a processing facility such as a furnace. Such contaminated sites include nuclear waste reprocessing and storage facilities, chemical weapons repositories, and other locations wherein undesirable or hazardous materials have been stored or otherwise located underground.

Many such buried waste facilities have proven inadequate to confine their respective waste materials to the originally-intended sites as a result of unstable geology or inadequate containment means. It would be desirable to provide a system that is capable of treating such contaminated sites in order to alleviate the contamination therein without having to remove and to transport large volumes of contaminated soil. It would also be desirable to provide a system for forming stable subterranean barriers to contain such underground contamination and to prevent migration of contaminants beyond the intended site or beyond the current boundaries of such underground contamination at sites that have already been compromised.

BRIEF DESCRIPTION OF THE DRAWINGS

The following detailed description of the preferred embodiments of the present invention will be better understood when read in conjunction with the appended drawings, in which:

FIGS. 1A–B are partially schematic diagrams of an electrode assembly for treating waste material;

FIGS. 2A–C are diagrams of alternative arrangements for initiating an electric arc between two electrodes of the electrode assembly of FIGS. 1A–B;

FIGS. 11A-B are partial cross-sectional views of the electrode assembly of FIGS. 1A-B employed in the practice of forming a subterranean support for piling construction; and FIG. 12 is a partial cross sectional view of an alternative system for forming a subterranean support for piling construction.

ELECTRODE ASSEMBLY

Figure 2A:
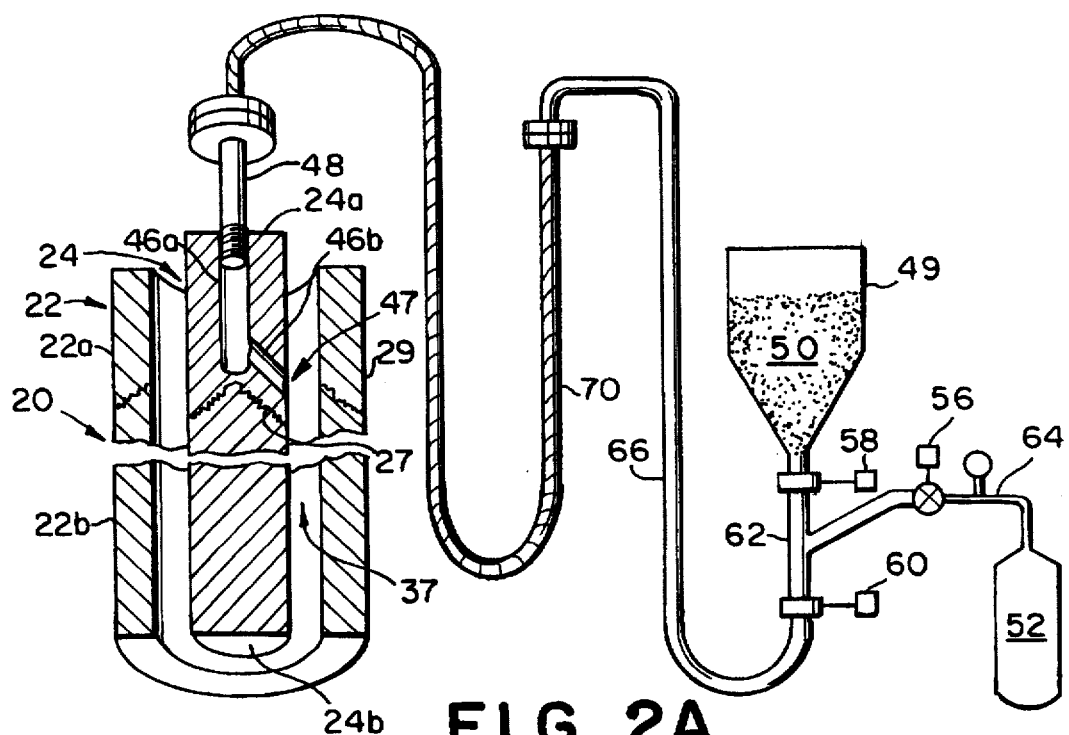

In FIG. 1A there is shown an electrode assembly 20. The electrode assembly 20 comprises a pair of concentric tubular electrodes 22 and 24, which are formed of a conductive material, preferably graphite. The outer electrode 22 is preferably in the form of a hollow cylinder. The inner electrode 24 is preferably in the form of a solid cylinder positioned coaxially relative to electrode 22. The electrode assembly 20 is positioned above a hearth, such as a graphite hearth 26, containing material to be processed. Such material may include, for example, heterogeneous waste material 21 that is to be processed. An electrical switching and power supply network 31 is connected with the electrode assembly 20 and the hearth 26 to provide sufficient electrical power for processing the heterogeneous waste material 21. The network 31 includes switches 36 and 38 for configuring the relative electrical polarities of the electrode 22, electrode 24, and the hearth 26 so that pyrolysis may be carried out in a non-transferred mode, in a transferred mode, or according to a controlled sequence of non-transferred and transferred modes of operation.

The electrical switching and power supply network 31 includes a power supply, such as DC power supply 30, having a positive terminal 34 and a negative terminal 32. The DC power supply may be a conventional power supply such as a thyristor-controlled power supply or, alternatively, may be of a type described hereinafter in connection with FIGS. 6A-B. The positive terminal 34 of the power supply 30 is connected to one terminal of a series inductor 33. The other terminal of series inductor 33 is connected to the inner electrode 24 of the electrode assembly 20 via switch 38 and conductor 40. The positive terminal 34 of the power supply 30 is connected to the hearth 26 through an ammeter 42. A contactor or switch 38 is connected to terminal 34 for connecting and disconnecting electrode 24 to the positive terminal 34 via conductor 40. A contactor or switch 36 is connected between conductor 40 and conductor 35 for connecting and disconnecting electrode 24 with the negative terminal 32 via inductor 33.

In order to operate the electrode assembly 20 in the non-transferred mode, switch 38 is initially closed and switch 36 is initially open so that a DC voltage is established between the inner conductor 24 and the outer conductor 22. Then, an arc 28 can be initiated and sustained between the inner electrode 24 and the outer electrode 22. The arc 28 produces radiant energy which is absorbed by the heterogeneous waste material 21 and converted into heat. Such direct radiant transfer of energy from the arc to the waste material differs substantially from the manner in which thermal energy is obtained during operation of a conventional plasma torch. A plasma torch, in contrast to the electrode assembly of the present invention, utilizes an electric arc that is internal to the torch apparatus. In order to transfer thermal energy from the internal arc of a plasma torch to the material to be processed, a flow of gas must be maintained within the torch such that the gas is heated by the arc and then expelled from the torch. As can readily be appreciated, no such flow of gas is required in order to treat waste material using a non-transferred DC arc in accordance with the present invention. The radiant transfer of energy from the arc 28 to the waste material 21 can be augmented with convective heat transfer by passage of an inert gas, such as argon or nitrogen, through the annular cavity between electrodes 24 and 22 and toward the waste material 21 in the hearth 26, if desired. The heat transferred to the waste material is sufficient to destroy or render inert the undesirable chemical constituents of the waste material 21. If the waste material includes such materials as silicates or metal oxides, then the waste material can be converted into a molten vitreous residue.

In order to operate the electrode assembly in the transferred mode, switch 36 is initially closed and switch 38 is initially open. In such a configuration, both the inner electrode 24 and the outer electrode 22 are maintained at the negative voltage provided at terminal 32 of the power supply 30 while the hearth 26 is maintained at the positive voltage presented by terminal 34 of the power supply 30. An electric arc 28a is then established between the electrode assembly 20 and the waste material 21 by lowering the electrode assembly 20 into contact with the waste material 21. If the waste material 21 is sufficiently electrically conductive, then electrical current will begin to flow through the waste material between the electrode assembly 20 and the hearth 26.

The series inductor 33, along with any parasitic impedances, determines the rate at which transient DC current is established within the waste material. When a steady-state has been reached, the electrode assembly is withdrawn from the surface of the waste material 21 in the vertical direction to establish the arc 28a. The transferred mode of operation provides more efficient transfer of energy to the waste material 21 than is provided in the non-transferred mode of operation. Additionally, the transferred mode of operation also provides physical mechanisms, such as Joule heating and promotion of electrokinetic chemical reactions, that contribute to enhanced decomposition and/or pyrolization of the waste material 21. As noted above, it is necessary for the waste material 21 to be sufficiently electrically conductive in order to initiate the transferred arc 28a by contacting the electrode assembly 20 to the waste material 21. This conductivity requirement has heretofore limited the benefits of transferred arc decomposition to the processing of waste material having sufficient electrical conductivity to establish and maintain conduction between an electrode and a hearth.

In order to process material having insufficient electrical conductivity for contact initiation of a transferred arc, the electrode assembly 20 can be initially operated in a non-transferred mode and then switched to a transferred mode of operation. The detailed procedure by which such sequential operation is performed depends, in part, upon the composition of the waste material to be treated and, in particular, upon the conductivity of the constituents of the waste material at elevated temperatures. It has been observed that certain materials that are poor conductors at room temperature, such as soils or waste materials containing metal oxides, become sufficiently conductive to establish a transferred arc after having been heated and/or melted by the non-transferred arc 28. A procedure for treating such materials may be carried out as follows. Beginning with switch 36 open and switch 38 closed, a non-transferred arc 28 can be established between the inner electrode 24 and the outer electrode 22. The waste material 21 is then heated by the non-transferred arc 28. When the waste material 21 has been heated to reach a sufficiently conductive condition, switch 38 can be opened and switch 36 can be closed. The sudden change in the polarity of the electrode 24 caused by opening switch 38 and closing switch 36, combined with the increased conductivity of the heated waste material 21, favor the formation of a transferred arc 28a. The transferred arc may extend from within the waste material at one end of the arc 28a to either one of the electrodes 22 or 24 at the other end of the arc 28a. Pyrolitic transformation and/or decomposition of the waste material 21 can then continue in the transferred mode.

The point in time at which the heated waste material 21 has become sufficiently conductive to permit switching from non-transferred to transferred operation can be determined by monitoring the ammeter 42 connected between the hearth 26 and the positive terminal 34 of the power supply 30. During the initial phase of the sequential procedure, when the electrode assembly 20 is operating in the non-transferred mode, the electrode assembly 20 is lowered to position the arc 28 within a close proximity to the surface of the waste material 21. As the waste material 21 becomes conductive, momentary transferred arcing will spontaneously occur from time to time. Such spontaneous transferred arcing will cause the ammeter 42 to register momentary bursts of electrical current supplied from the positive terminal 34 to the hearth 26. When such momentary increases in current are registered by the ammeter 42, switch 38 can be opened and switch 36 can be closed under either manual or automatic control in order to begin sustained operation of the electrode assembly 20 in the transferred mode.

During the initial non-transferred phase of the sequential procedure, the heterogeneous waste material 21 will often melt and coalesce, as shown in FIG. 1B, into two or more layers, such as molten layers 21a and 21b, depending upon the relative density of the constituent components of the waste material 21. If the layers 21a and 21b are sufficiently conductive, the electrode assembly 20 can be switched into the transferred mode as has been described. More often, however, the conductive metallic constituents of the waste material 21, such as metals, tend to settle into the lower layer 21b while the less conductive constituents, such as refractory oxides and/or organic compounds, tend to accumulate in the upper layer 21a. The presence of the less conductive constituents within the upper layer 21a can inhibit the formation of a transferred arc. In order to establish a transferred arc between the electrode assembly 20 and the molten waste material in such circumstances, the electrode assembly 20 can be lowered into the upper layer 21a of the molten waste material 21. As the electrode assembly 20 is submerged beneath the surface of layer 21a, the central portion 23 of the non-conductive layer 21a is vaporized by the non-transferred arc. The electrode assembly 20 can continue to be lowered until spontaneous transferred arcing occurs between the negative outer electrode 22 and the conducting layer or layers 21b in contact with the hearth 26. Then, the electrode assembly can be switched into the transferred mode.

An alternative procedure for treatment of a marginally-conductive bulk waste material having conductive and non-conductive constituents can be carried out as follows. The electrode assembly 20 is initially placed in contact with the waste material 21 while switch 36 is initially open and switch 38 is initially closed. Electrical current then flows from the inner electrode 24, through the marginally-conductive waste material 21, and to the outer electrode 22. The resulting Joule heating, or $I^2R$ heating, of the waste material 21 causes the waste material to melt and subsequently to vaporize within the vicinity of the electrode assembly 20 forming a void 23, as indicated in FIG. 1B by dashed lines. Also, as the waste material vaporizes, a non-transferred arc can be initiated between the electrodes 22 and 24. As such melting and vaporization proceed, the electrode assembly 20 is lowered into the void 23 so that a transferred arc may be established as previously described. Alternatively, the electrode assembly may be maintained at its original position if the upper layer 21a molten waste material becomes sufficiently conductive to establish a transferred arc.

In order to operate the electrode assembly 20 in the non-transferred mode for sustained non-transferred operation, or during the initial phase of sequential operation, it is necessary to establish a non-transferred arc between the two electrodes 22 and 24. A non-transferred arc may be ignited or struck by establishing a voltage between the inner electrode and the outer electrode and then touching the proximal end of the electrode assembly 20 to the surface of the waste material 21. If the separation distance between the electrodes 22 and 24 is small relative to the depth of the waste material, then the effective resistance of a conduction path between the two electrodes will be less than the resistance of a path through the waste material from the electrodes to the hearth. Thus, a non-transferred arc may be initiated by contacting the electrodes to the waste material even if the waste material is not conductive enough to establish sufficient conduction for transferred arc initiation.

If the surface of the waste material 21 is not sufficiently conductive to initiate a non-transferred arc by contacting the waste material, then other means for striking a non-transferred arc are necessary. A preferred arrangement for striking a non-transferred arc in such a circumstance is shown in FIG. 2A. The arrangement of FIG. 2A allows an electrically-conductive fine particulate material to be injected into the annular cavity between the inner and outer electrodes in order to promote formation of a non-transferred arc.

Referring to FIG. 2A, the inner electrode 24 preferably includes a disposable lower portion 24b that is removably attached to a upper portion 24a, such as by a threaded connection 27. Similarly, the outer electrode 22 preferably includes a disposable lower portion 22b that is removably attached to an upper portion 22a by a threaded connection 29. Since each of the electrodes includes such separable segments, the lower portion of each electrode may be replaced whenever replacement becomes desirable due to, for example, deterioration.

An axial bore 46a is formed within the upper portion 24a of the inner electrode 24. The lower end of the axial bore 46a intersects with an angled bore 46b leading to an orifice 47 between the angled bore 46b and the annular cavity 37 between the inner electrode 24 and the outer electrode 22.

The bores 46a and 46b within the inner electrode 24 permit the introduction of fine particulate material into the annular cavity as follows. A hopper 49 is provided for containing a quantity of fine particulate material, such as graphite powder 50. The lower end of the hopper 49 is connected to a mixing tee 62 via a valve 58. When a non-transferred arc is to be struck, the valve 58 is momentarily opened and then closed in order to deposit a fixed quantity of graphite powder into the mixing tee 62. When valve 58 has been closed, and valve 60 is opened, a solenoidal valve 56 is opened, so that the mixing tee 62 is connected to a supply of inert gas 52, such as nitrogen, via a regulated gas line 64, to connect the mixing tee 62 to a pipe 66 and to cause the deposited charge of particulate material to be forcibly swept into the pipe 66 under pressure provided by the inert gas 52. A length of tubing 70 is connected at one end to the pipe 66 to receive the charge of particular material. The other end of tubing 70 is connected to a tubing adapter 48 that is threaded into the axial bore 46a.

When valve 60 is opened, the charge of particulate material is thus transmitted through tubing 70 and adapter 48 into the axial bore 46a. The charge of particulate matter then travels through bore 46b to be expelled into the annular cavity via an orifice 47. The electrode assembly can be disconnected from the power supply prior to injecting the conductive fine particulate into the annular cavity. When this material has been injected into the annular cavity, the electrode assembly can then be energized after a sufficient period of time has passed for the particulate material to be located substantially at the tip of the electrode assembly. If the electrode assembly has been energized, the resulting particulate matter introduced into the annular cavity promotes the formation of a non-transferred arc between the inner electrode 24 and the outer electrode 22. The injected particulate material drifts downward within the annular cavity, reaching a stable position at the lower tip of the electrode assembly 20. The downward drift of the injected particulate suspension may be enhanced by leaving valves 56 and 60 open for a period of time subsequent to injection of the charge in order to, in effect, blow the non-transferred arc into a position at the tip of the electrode assembly. Since the inner electrode 24 is switchable from a positive polarity to a negative polarity relative to the outer electrode 22 during the sequential mode of operation, it is desirable to provide electrical isolation between the inner electrode 24 and the several components of the arc ignition system, such as the hopper 49 and the gas cylinder 52. Such electrical isolation may be obtained by providing flexible tubing 70 in the form of an electrically insulating material. It is also desirable to prevent a conductive path from forming within the tubing 70 due to any adhesion of the particulate material to the interior wall of the flexible tubing 70. For this reason, it is preferable that the flexible tubing 70 be made of a non-adherent material, such as reinforced silicone or polytetrafluoroethylene, so that adhesion between the particulate material and the interior surface of the flexible tubing 70 is minimized. It is also preferable that the tubing 70 be flexible so that the tubing 70 remains attached to the connector 48 when the electrode assembly 70 is raised and lowered.

An alternative method of striking a non-transferred arc is illustrated in FIG. 2B. The upper ends of electrodes 22 and 24 are held within respective annular clamps 72 and 74. The annular clamp 74 is angularly translatable relative to clamp 72, such as by a suitable pivoting means (not shown). The inner electrode 24 can be positioned at an angle within the axial cavity of electrode 22, such that the tip of electrode 24 is in contact with or in sufficient proximity to the inner periphery of electrode 22 to establish DC conduction between the inner and outer electrodes. In this arrangement, the formation of a non-transferred arc is readily initiated.

Another alternative arrangement for striking a non-transferred arc is illustrated in FIG. 2C. In this configuration, the upper ends of electrodes 22 and 24 are held within annular clamps 72 and 74, respectively. The annular clamps 72 and 74 are secured to a disc of insulating material 78 so that the electrode 24 is held coaxially within the electrode 22. The interior surface of the outer electrode 22 includes an inwardly-projecting tapered portion 25 so that the annular cavity between the inner electrode 24 and the tapered portion 25 of outer electrode 22 is constricted to a relatively small gap at the upper end of the outer electrode 22. The constriction of the annular cavity caused by the taper 25 allows a non-transferred arc to be initiated between the inner electrode 24 and the tapered portion 24 of outer electrode 22 at a relatively lower voltage than would be possible for a uniformly wide annular separation between the electrodes 24 and 22.

In order to position the non-transferred arc at the lower tip of the electrode assembly, pressurized gas is supplied via tubing 75 to an internal passageway 76 within the insulating disc 78. The internal passageway 76 terminates in an orifice 79 located on the interior surface of the insulating disc 78 so that pressurized gas supplied via tubing 75 causes a pressure differential within the annular cavity 77 located between the inner electrode 24 and the insulating disc 78. The resulting pressure differential within the annular cavity 77 causes the gas to flow through the gap between the inner electrode 24 and the outer electrode 22, thus urging the non-transferred arc toward the tip of the electrode assembly 20. In general, a wide variety of geometric irregularities may be formed between the outer surface of the inner electrode and the inner surface of the outer electrode in order to promote the formation of a non-transferred arc in an equivalent manner to that described in connection with FIG. 2C. Still other provisions for striking the non-transferred arc, such as connecting the electrodes 22 and 24 to a high voltage sparking circuit that is isolated from the DC power supply, are possible within the scope of the invention.

DC ARC FURNACE

Figure 3:
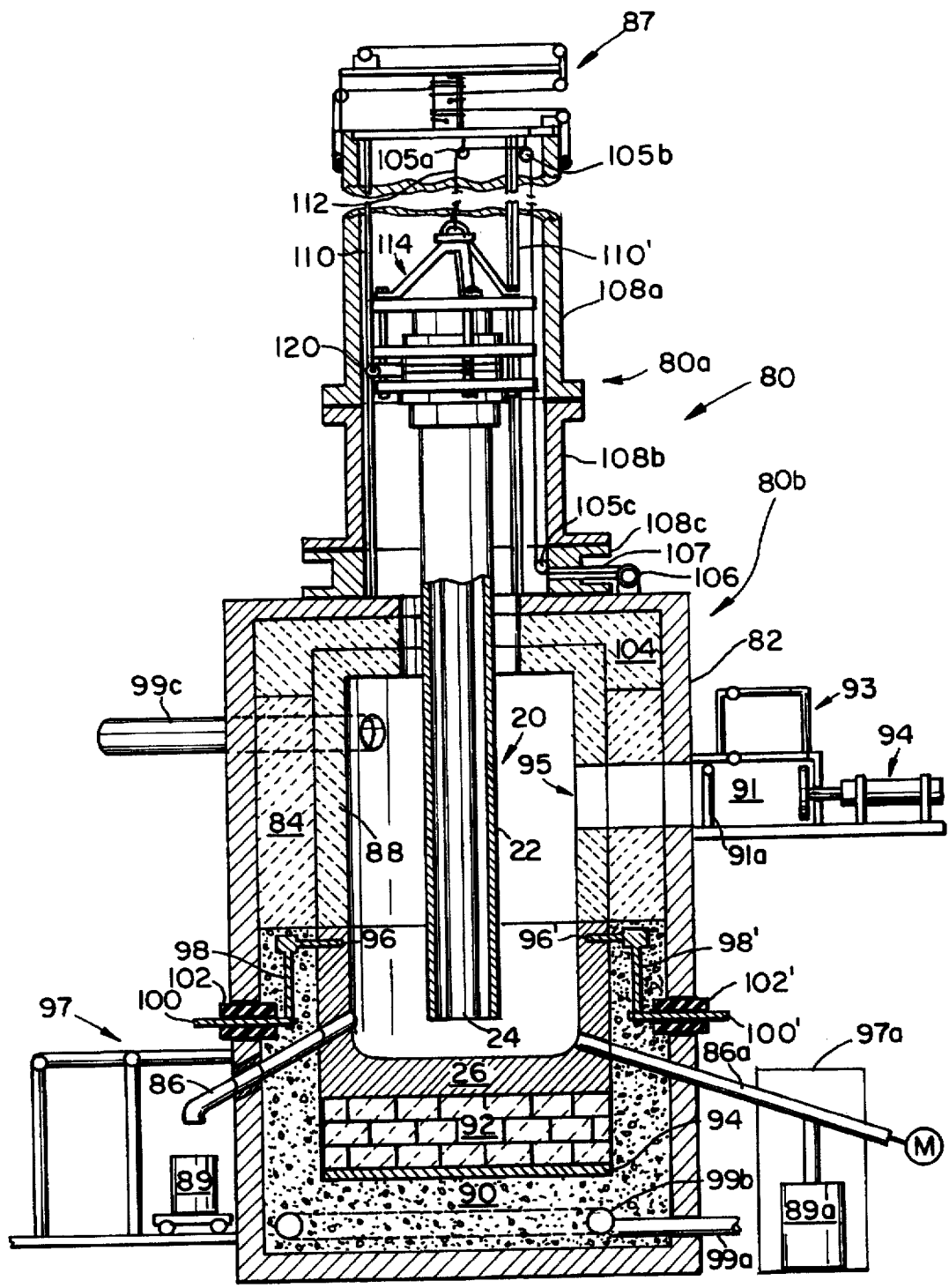
FIG. 3 is a partial cross-sectional view of an arc furnace employing the electrode assembly of FIGS. 1A–B.

The electrode assembly 20 in accordance with the foregoing description is suitable for operation within a DC arc furnace, such as the furnace 80 shown in FIG. 3. The upper end of electrode assembly 20 is attached to a clamping assembly generally designated 114 that is suspended within housing 80a. The electrode assembly 20 extends downward within the housing 80a from the clamping assembly 114 and into a processing chamber generally designated 80b. An exterior shell 82 surrounds the processing chamber 80b. The shell 82 is preferably made of an electrically-conductive material, such as a steel. The interior of the steel shell 82 is preferably lined with several thermally and electrically insulating materials. Such insulating linings include, for example, a bed of granular material, such as silica or granite chips 90, filling the lower portion of the shell 82, a refractory ceramic or clay material 84 lining the mid-section of the shell, a refractory facing 88 forming the interior surface of the furnace, and a refractory vault 104 lining the upper portion of the shell.

A gas conduit 99a extends from a source of inert gas (not shown) through the shell 82 and into the granular bed 90. The conduit 99a is connected to a perforated tubular ring 99b that is located within the granular bed 90. Prior to operating the furnace, an inert purge gas can be introduced through conduit 99a into the ring 99b. The purge gas will then percolate through the perforations of ring 99b and through the granite bed 90. When the interstitial spaces within the granular bed 90 are sufficiently pressurized by the purge gas, the purge gas will then diffuse into the interior of the furnace through fissures, pores, and the like within the refractory material 84 and the refractory material 88. An exhaust port 99c extends from the interior of the processing chamber to an appropriate external ventilation system for venting any gases generated during waste treatment while maintaining the desired non-oxidizing atmosphere within the furnace. In this manner, the proportion of oxygen within the furnace can be decreased in order to inhibit oxidation of the graphitic material, such as the electrodes, during operation of the furnace in the treatment of waste material.

A hearth 26 is located in the lower portion of the shell 82. The hearth 26 is supported upon a layer of refractory material 92 resting upon a supporting plate 94 that is embedded within the granular bed 90. Electrical contact is made to the hearth 26 via graphite pegs 96 and 96', respectively, that are embedded in holes within the hearth 26. The graphite pegs 96 and 96' are connected to conductive straps 98 and 98' which are preferably flexible to allow for thermal expansion of the hearth. The conductive straps 98 and 98' are connected to conductors 100 and 100', respectively, which lead to the exterior of the shell 82 through insulating bushings 102 and 102', respectively.

In addition to providing mechanical support for the layer of refractory material 92 and the hearth 26, the supporting plate 94 may be made of a ferromagnetic material in order to provide enhanced magnetic control and stabilization of the DC arc. Such magnetic control is desirable to attract and to maintain a non-transferred arc at or near the tip of the electrode assembly and to maintain transferred arcs in an area beneath the electrode assembly and near the center of the hearth. In the absence of such control, the arc may tend to drift upward within the electrode assembly during non-transferred operation or to wander during transferred operation upward drift of the non-transferred arc undesirably decreases the efficiency of heat transfer from the arc to the waste material. Positional instability of the transferred arc can contribute to uneven heating of the waste material and premature erosion of the hearth.

The presence of the ferromagnetic plate 94 beneath the hearth causes an attractive force to be exerted upon the arc, thus stabilizing the arc. This attractive force is generated due to the interaction of the arc current with the magnetic field of induced currents within the plate. In order to maximize the stabilizing influence of the magnetic plate upon the arc, the plate should be positioned as close as possible to the bottom of the hearth.

The proximity with which the magnetic plate may be positioned relative to the bottom of the hearth is limited by the necessity of retaining the magnetic characteristics of the material used to form the plate. If the plate is heated to a temperature above the Curie temperature of the plate, the electromagnetic stabilization beneficial effect of the plate is adversely influenced. The magnetic plate is preferably positioned at a distance below the bottom of the hearth that is sufficient to maintain the plate below the Curie temperature. In order to satisfy this thermal condition, while positioning the plate as close as possible to the bottom of the hearth, one or more layers of thermally insulating material, such as the refractory material 92, are preferably interposed between the bottom of the hearth and the magnetic plate. The required thickness of the refractory material 92 or other thermally insulating layer is determined by the conductivity of the insulating layer, the desired hearth temperature, and the Curie temperature of the plate according to well-known principles of thermal equilibrium.

The surface area of the magnetic plate may be smaller than the bottom of the hearth in order to provide a concentration of the induced magnetic flux near the center of the hearth. For example, a round magnetic plate with a diameter of 30 inches positioned beneath a 48 inch diameter hearth would be sufficient to centrally position an arc beneath an electrode assembly having a 14 inch outer diameter. The plan surface of the magnetic plate is preferably of the same shape and size, or even larger than, the bottom surface of the hearth in order to provide a suitable mechanical base for the hearth and the intervening layer of thermal insulation.

The upper limit of suitable ferromagnetic plate size can be determined by the size of the furnace shell and the thermally-dependent dielectric characteristics of the insulating material, such as the granite chips, surrounding the plate. Since a high DC potential exists between the hearth and the shell, it is important to maintain electrical isolation between the hearth and the shell. During operation of the arc, the insulating material in contact with the hearth, such as the refractory layer 92, may become electrically conductive as the temperature is increased. If the ferromagnetic plate extends laterally from beneath the refractory material 92 to within a sufficient proximity of the shell, a conductive path may be established from the hearth, through the refractory material 92, and then through the ferromagnetic plate to the shell. Such a conductive path would cause an undesirable short-circuit between the hearth and the shell. The size of the ferromagnetic plate should therefore be selected to leave sufficient insulating material between the ferromagnetic plate and the shell so that such a short circuit will not occur. For a furnace shell having an inner diameter of 72 inches, the diameter of the ferromagnetic plate should be approximately 60 inches or less, so that the circumferential edge of the plate is separated from the shell by at least 6 inches of granite chips. The necessary size of the ferromagnetic plate and the separation between the plate and the shell can thus be determined by those skilled in the art on the basis of the particular operating conditions and materials used in various embodiments of the invention in accordance with the principles made apparent herein.

The ferromagnetic plate may also have a central perforation or hole therein (not shown) in order to further stabilize the arc. It is believed that such a central hole provides enhanced stabilization by eliminating eddy currents within the plate that would otherwise intersect the vertical axis defined by the electrode assembly and along which axis the arc is desired to be maintained.

A material feeding aperture generally designated 95 is located in the side of the processing chamber 80b. The aperture 95 opens into the processing chamber 80b from a feed chamber 91 in which waste material to be processed is inserted. Isolation gate 91a is opened as waste material within the feed chamber 91 is pushed into the processing chamber 80b via the aperture 95 by a hydraulic pushing mechanism 94. For continuous processing of waste material, a loading airlock or isolation gate 93 is connected with the feed chamber 91, so that additional waste material may be introduced into the feed chamber 91 from time to time while maintaining an airtight environment within the furnace.

For continuous removal of molten material from the processing chamber 80b, a conduit 86 is provided. The conduit 86 leads from the lower portion of the interior of the hearth 26 to an isolated discharge chamber generally designated 97. Located within the isolated discharge chamber 97 is a receptacle 89 for receiving molten waste material from the conduit 86. The conduit 86 is preferably heated to prevent the molten slag material from solidifying as it is drained from the hearth 26 to a slag receptacle 89. The conduit 86 may be heated by, for example, graphite heating elements within a ceramic muffle surrounding the conduit. The graphite heating elements can be connected with an adjustable voltage AC source. Since the atmosphere in the furnace chamber is non-oxidizing, the graphite heating elements are thus protected from oxidation. The isolated discharge chamber 97 includes isolation gates allowing receptacle 89 to be replaced from time to time, while maintaining an airtight environment within the processing chamber 80b.

An additional conduit 86a can be provided for removal of relatively dense molten materials from the lower portion of the hearth 26. The conduit 86 allows such material to be discharged into a collection receptacle 89a that is housed within an isolation enclosure 97a. A motor driven shaft (not shown) is provided within the conduit 86a for locating a removable plug (not shown) at the end of the conduit 86a within the hearth 26 in a known manner.

Alternative mechanisms for loading and discharging material from the hearth are possible within the scope of the invention. For example, an alternative arc furnace may be constructed, wherein the processing chamber may be separable from the electrode housing so that molten waste material may be removed from the hearth by tipping the processing chamber.

The housing 80a includes several flanged tubular segments 108a, 108b and 108c defining an airtight cylinder, providing housing 80a, positioned above the processing chamber 80b. The electrode assembly 20 may be translated along the vertical axis of the cylinder forming housing 80a. Other ports may be formed in the electrode housing 80a or in the processing chamber 80b for introducing and/or removing gases into and/or from the furnace to maintain an appropriate ambient environment within the chamber. The tubular segments 108a, 108b and 108c may be individually detachable from the furnace 80 to provide access to the electrode assembly 20 or the clamping assembly 114 for maintenance or repair. The tubular segments may be raised or lowered by a hoisting mechanism generally designated 87 mounted above the housing 80a, so that such access may be made at any location within the electrode housing 80a.

The clamping assembly 114 is suspended within the electrode housing 80a by a cable 112. The cable 112 is connected via pulleys 105a, 105b, 105c and through a conduit 107 to a winch 106. The winch 106 is preferably sealed relative to the atmosphere external to the electrode housing 80a, so that no potentially toxic gases are vented via the conduit 107. The winch 106 can be operated to raise or lower the clamping assembly 114 within the electrode housing 80a. Vertically mounted guide rails, such as rails 110 and 110', are positioned, e.g. at 120° intervals, within the interior periphery of the electrode housing 80a. The clamping assembly 114 includes rollers, such as roller 120, that ride upon the guide rails to maintain the vertical alignment of the electrode assembly 20 within the processing chamber as it is raised and lowered.

Figure 4:
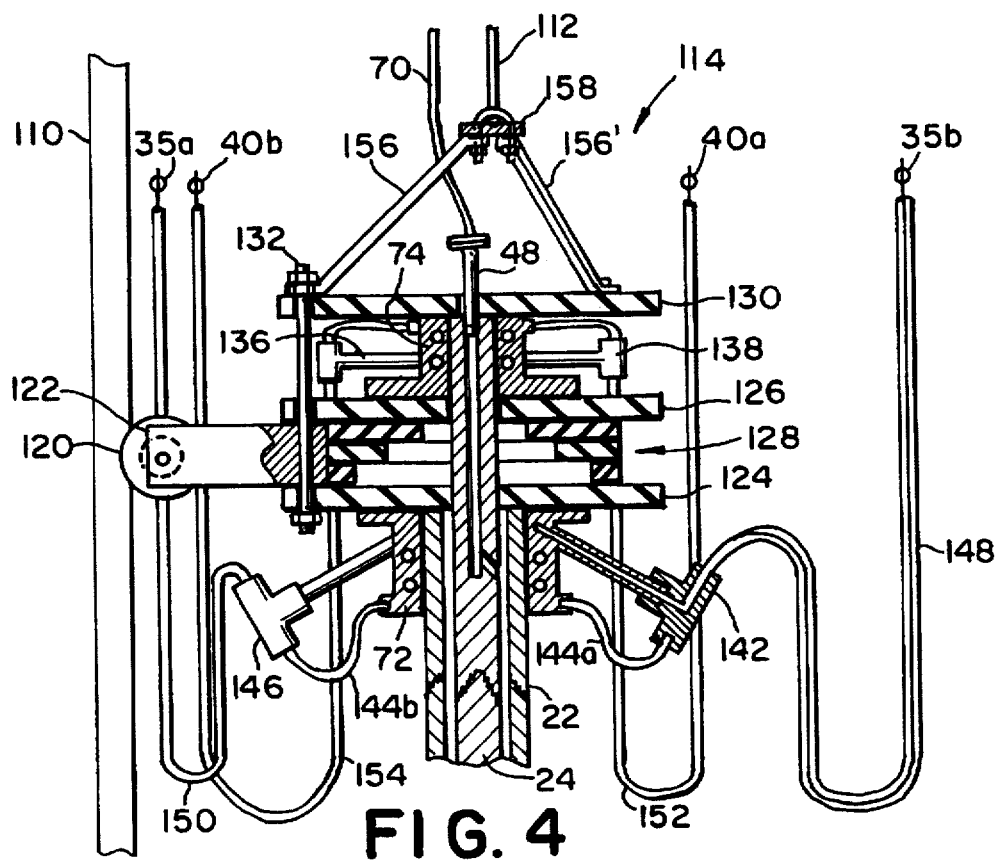
FIG. 4 is a partial cross-sectional view of a clamping structure for supporting the electrode assembly within the furnace of FIG. 3.

The clamping assembly 114 is shown in greater detail in FIG. 4. The outer electrode 22 is securely held within a water cooled clamp 72. The water cooled clamp 72 is connected to a source of cooling water via connector 142 and hose 148. Cooling water received into clamp 72 via connector 142 is discharged via a similar connector 146 to hose 150. The respective cooling water supply and discharge hoses 148 and 150 also serve as conduits for electrical cables 35a and 35b, respectively.

The clamp 72 is secured, such as by bolts (not shown), to the underside of an insulating disc 124. The insulating disc 124 has a central hole in which the inner electrode 24 is positioned. The inner electrode 24 is secured within a water cooled clamp 74. The clamp 74 is fastened to the upper surface of an insulating disc 126, for example by bolts (not shown). Several insulating discs 128 are sandwiched between discs 124 and 126 to provide sufficient insulation between the clamps 72 and 74 while maintaining coaxial alignment of the electrodes 24 and 22. Guide wheel mounts, such as mount 122, are held in place between discs 124 and 126 by tie rods, such as tie rod 132. The tie rods have threaded ends and are secured to the bottom surface of disc 124 by nuts. The tie rods extend vertically through disc 124, guide wheel mounts 122, disc 126, and through an upper insulating disc 130. Nuts are threaded onto the upper ends of tie rods 132 so that the clamping assembly 114 is held together by a compressive force exerted by the tie rods. Struts 156 are secured to the upper end of the tie rods 132. The struts 156 extend angularly upward and inward and are attached to a hub 158 from which the clamping assembly 114 is suspended.

Figure 5:
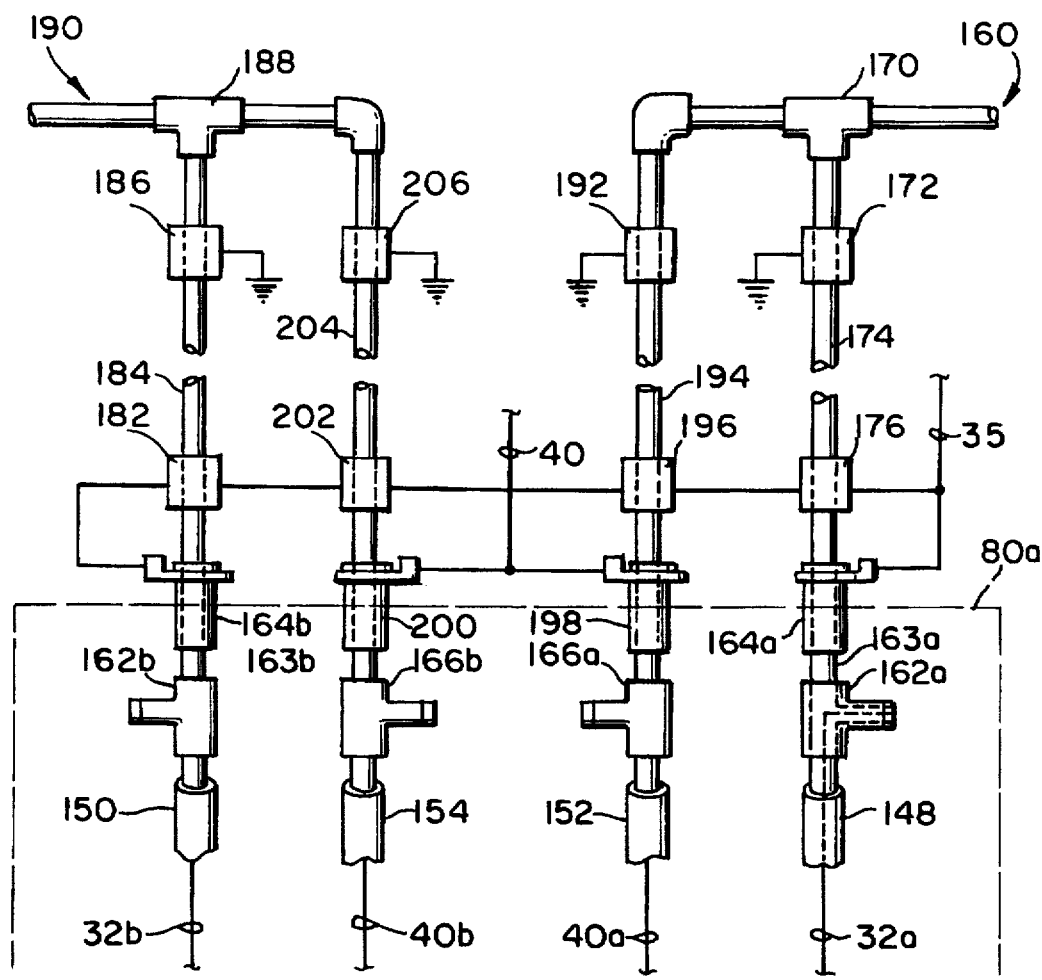
FIG. 5 is a diagram of a combined plumbing and electrical system for connecting the clamping structure of FIG. 4 with cooling water and electrical power.

The electricity and cooling water may be supplied to the clamps 72 and 74 through a system such as shown in FIG. 5. Hoses 148 and 150 from clamp 72 are connected with respective couplers 162a and 162b. The couplers 162a and 162b each have an internal electrical terminal for connecting respective electrical cables 32a and 32b with conduits 163a and 163b. Conduits 163a and 163b are extended through the top of the electrode housing via respective bushings 164a and 164b. The conduits 163a and 163b are connected to conductor 35 of the electrical supply network at terminals mounted upon the bushings 164a and 164b.

The cooling water circuit for clamp 72 operates as follows. Cooling water is provided via pipe 160. A portion of the cooling water from pipe 160 is diverted at tee 170 to flow into an electrical isolating coupler 172. The coupler 172 is a hose coupler having an internal graphite lining that is grounded in order to isolate the cooling water supply plumbing from any electrical currents which may be conducted within the cooling water itself. The graphite lining of the coupler 172 also protects the upstream plumbing from electrolytic damage that would occur from such conduction within the cooling water. The cooling water flows through the coupler 172 and into a length of insulating hose 174 that provides further electrical isolation of the plumbing supply. An electrical isolating coupler 176 receives the cooling water from hose 174. The coupler 176 is connected to conduit 163a which passes into the electrode housing 80a via feed-through or bushing 164a. Conduit 163a connects to hose 148 via coupler 162a. Hose 148 supplies cooling water to the clamp 72. Cooling water from clamp 72 returns to coupler 162b via hose 150 and is passed through coupler 162b into conduit 163b which passes out of the top of the electrode housing 80a via feed-through 164b. The return water is passed through an electrical isolating coupler 182 connected to a length of insulating hose 184 and then into a grounded electrical isolating coupler 186. From the coupler 186, the return water passes via a tee 188 to drain pipe 190.

The cooling water circuit for the clamp 74 is similar to that provided for the clamp 72. Cooling water from supply line 160 passes through tee 170 and into grounded coupler 192, through insulated hose 194 and coupler 196 into feed-through 198. From feed-through 198 the cooling water passes through coupler 166a and into hose 152 which leads to clamp 74. Water returned from clamp 74 arrives via hose 154 and through coupler 166b into feed-through 200. From feed-through 200, the returned water from clamp 74 passes through coupler 202 into insulating hose 204 and into grounded coupler 206 from which the returned water passes through tee 188 and into drain pipe 190.

POWER SUPPLY SYSTEM

During operation of a DC arc, the arc is susceptible to a variety of transient phenomena. For example, in the decomposition of hazardous wastes, gases may be expelled from the waste that can alter the composition of the ionization path between the electrode assembly and the waste material. In the latter case, the effective electrical resistance of the arc may be increased or decreased. If the DC arc is extinguished, it may be re-initiated according to the procedures discussed previously herein. However, it is desirable to provide a power supply system that is capable of providing a controllable constant current to the electrode assembly during arc transients and supply such current over a relatively broad range of current. Such control of the current is particularly important in initiating an electric arc by contacting the electrode to conductive material. During such contact, it is desirable to limit the available current so that a short-circuit condition does not overload the components of the DC power system.

Several suitable transient-resistant DC power supplies are disclosed in U.S. Pat. No. 4,461,010, issued Jul. 17, 1984, and such disclosure is incorporated herein by reference. The '010 patent discloses several circuits wherein a linear reactor is placed in series with the secondary terminals of a three-phase transformer. The linear reactor is connected in series to a three-phase diode rectifier, which provides a DC voltage and current to an arc furnace. In the last-mentioned arrangement in the '010 patent, the power to the DC arc may be mechanically adjusted according to the separation distance between the arcing electrodes. In the practice of the present invention, it has been found desirable to provide a range of control of the power to the DC arc in order to facilitate consistent DC arc power independent of the length of the arc.

It has also been found desirable to be able to adjust the power to the arc, where the arc in the furnace may be constant length. The ability to maintain a consistent power level to an arc of variable length is particularly desirable for operating the arc in the transferred mode, wherein the level and composition of the treated waste material varies during treatment. In contrast, in operation with constant arc length, it is particularly desirable during any non-transferred mode of operation, to maximize the power transferred to the waste material, so that any insulating layer, which may have been formed at the surface of the waste material, may be made molten and/or vaporized prior to establishing a transferred arc.

Figure 6B:
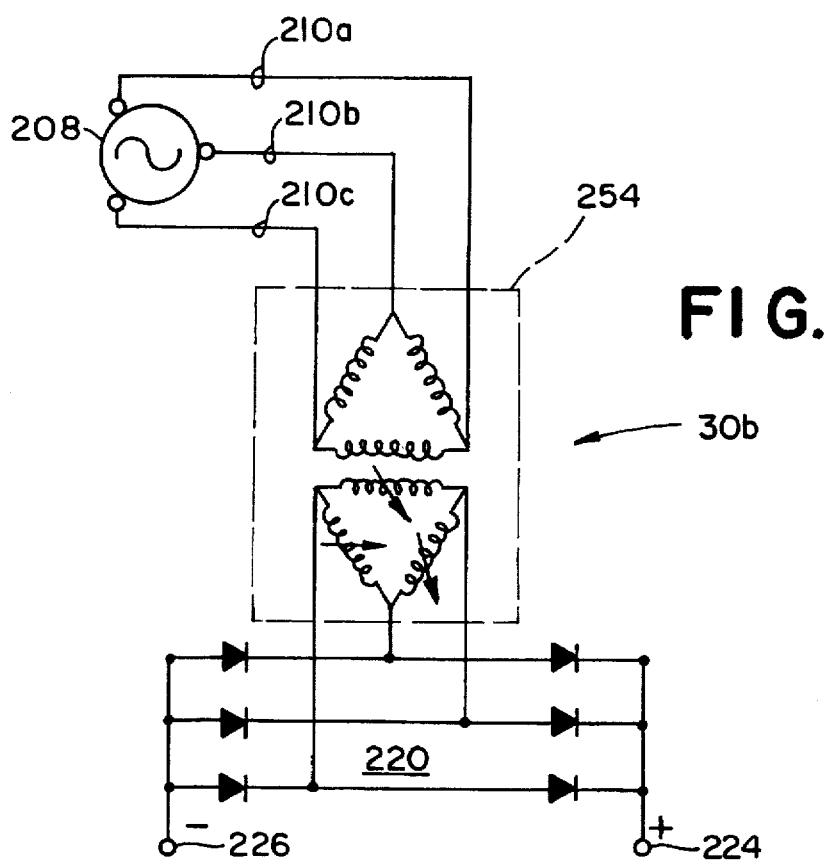
FIG. 6A–B are schematic diagrams of alternative DC electrical power supply systems for supplying electrical power to an electrode assembly.
Figure 6A:
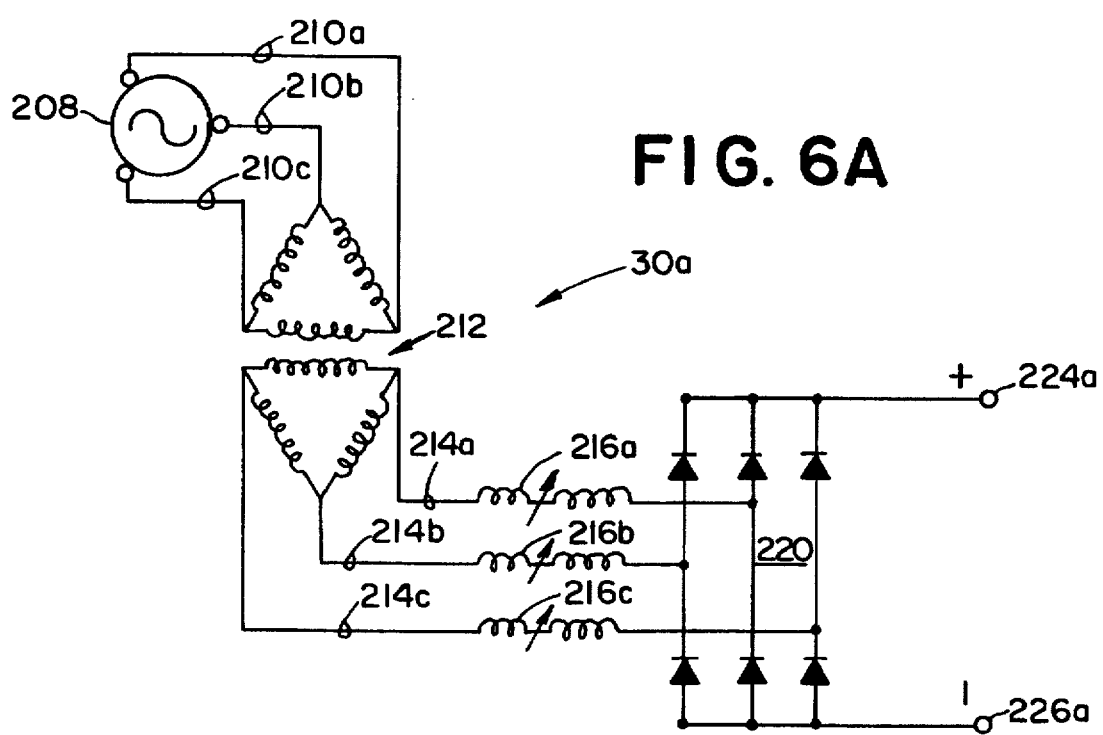

To facilitate the above power requirements, there is shown in FIG. 6A a DC power supply circuit 30a that is capable of providing variable electrical power to a constant length arc while maintaining a constant current supply to the arc during transient conditions. In FIG. 6A, A three-phase AC power source 208 is connected by conductors 210a, 210b and 210c to the primary terminals of a three-phase transformer 212. The secondary terminals of transformer 212 are each connected in series by conductors 214a, 214b and 214c to variable reactors 216a, 216b and 216c, respectively. The variable reactors are connected, in turn, to a three-phase rectifier 220, which is preferably a diode rectifier providing a positive DC output at terminal 224a and a negative DC output at terminal 226a.

Figure 7:
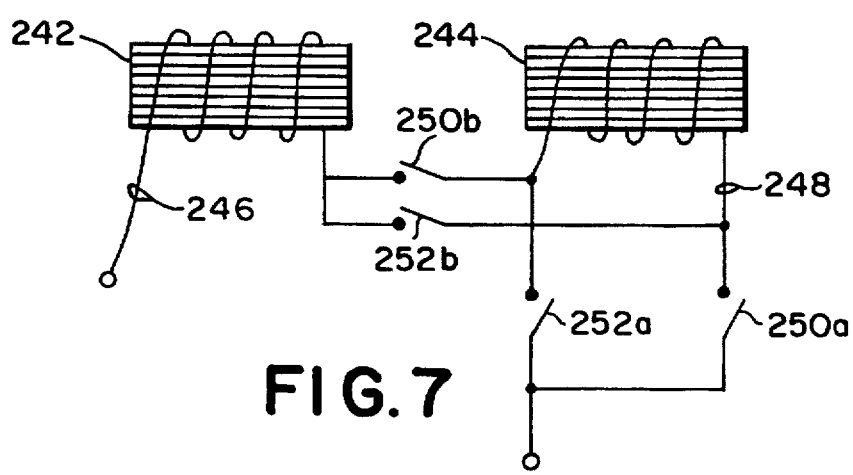
FIG. 7 is a diagram of adjustable leakage-coupled inductors for use in the power supply systems of FIGS. 6A–B.

In order to provide effective control of the power to the DC arc over a wide operating range, it is desirable that the variable reactors 216a, 216b and 216c provide a variable inductance over a relatively large range of inductance values. Such a large range of variable inductance is attainable by utilizing adjustable reactors of the type wherein the leakage inductance between two movable coils may be varied. An arrangement for providing a suitably large range of variable inductance for the variable reactor 240 is shown in FIG. 7. In this arrangement, the variable reactor 240 includes cores 242 and 244, which comprise solid laminated magnetic cores. Switches 250a, 250b, 252a and 252b are connected as shown so that the coil 246 or core 242 may be electrically configured to have a positive or a negative mutual inductance. When switches 250a and 250b are closed and switches 252a and 252b are open, the flux linkage between the magnetic cores 242 and 244 will be additive. When switches 250a and 250b are open and switches 252a and 252b are closed, the current within coil 248 is reversed with respect to the current within coil 246, which causes an opposing flux linkage effect between the magnetic cores 242 and 244. The ability to select and vary the additive or opposing effects of the mutual inductance for the variable reactors facilitates varying the resistance over a wider range than available in prior hard wired configurations.

It is also possible to provide such variable coupling between the primary and secondary coils of the three-phase transformer in the power supply system, thus eliminating the need for separate variable reactors in series with the secondary windings of the three-phase transformer. This latter alternative is shown in FIG. 6B, wherein the power supply system 30b includes a three-phase power supply 208 connected to the primary windings of a variable leakage-coupled transformer generally designated 254. The primary and secondary windings within the transformer 254 may be variably coupled, as described in connection with the series reactors shown in FIGS. 7a and 7b. When configurations of the type disclosed in FIGS. 7A or 7B are utilized for the windings of the variable transformer, the windings upon each of the movable cores are connected to respective individual terminals so that each pair of movable cores provides one primary leg and one secondary leg of the transformer 254 as shown in FIG. 6B. The secondary terminals of transformer 254 are connected to a three-phase rectifier generally designated 220, as shown in FIG. 6B, so that a positive DC voltage is provided at terminal 224b and a negative DC voltage is provided at terminal 226b.

IN SITU VITRIFICATION OF CONTAMINATED SOILS

Figure 8A:
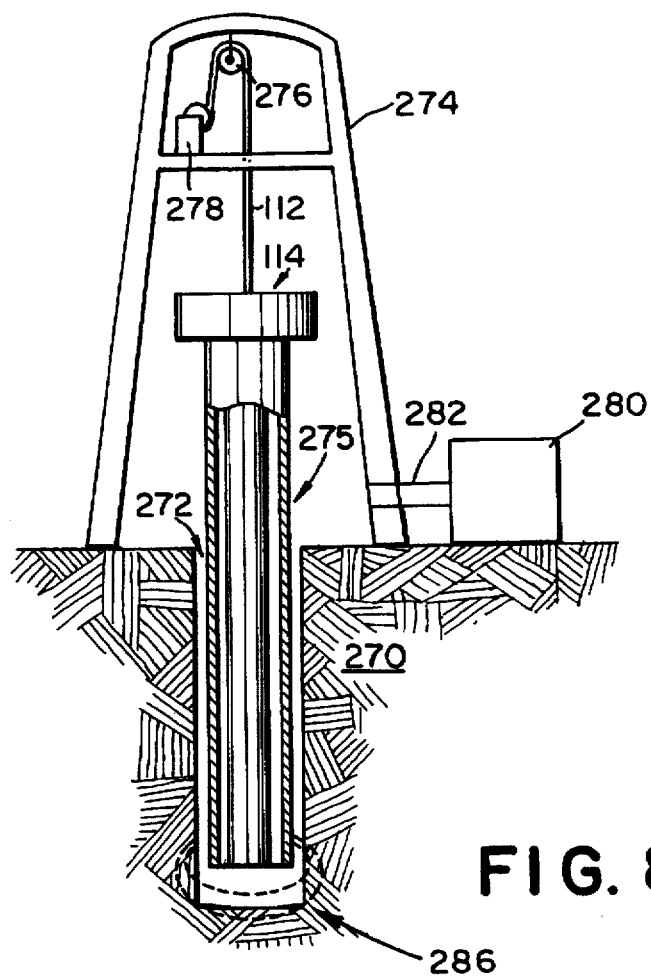
FIGS. 8A–B are partial cross-sectional views of the electrode assembly of FIGS. 1A–B employed in the practice of vitrifying contaminated soil at a site of contamination.

The electrode arrangements and the power supply systems, according to the foregoing description, can also be used independently of a DC arc furnace system for in situ vitrification and remediation of contaminated soils. A dual mode electrode pyrolysis system may be assembled and operated in situ at a contamination site, as indicated in FIG. 8A.

A borehole generally designated 272 is formed within the ground 270 at a site of soil contamination. The borehole may be formed by any of the drilling techniques well-known in the art and obviously have a diameter larger than that of the electrode assembly 20. The borehole 272 extends into the ground 270 to a depth commensurate with the depth of soil contamination. A suitable support structure 274 is located above the borehole 272 for supporting electrode assembly 275 within the borehole. The support structure 274 may be coextensive with a drilling derrick or other apparatus used to form the borehole 272. Alternatively, the support 274 may be a transportable structure adapted to transport the electrode assembly to a site. The support 274 also is preferably adapted to support associated array of electrical connections for operation of the electrode, which may be configured as shown and described in regard to electrode 20 in FIG. 3.

The support structure is preferably provided with suitable means for raising and lowering the electrode assembly 275 within the borehole 272. A cable 112 is connected to the electrode clamping assembly 277 and passes over a pulley 276 to a winch 278. Electrical supply means for supplying electric power and for supply means for supplying cooling water to the assembly may be provided in a conventional manner within a utility structure 280, such as a trailer or other temporary structure, that can be transported to the remediation site.

For the remediation of soils containing toxic contaminants, the electrode support structure 274 may preferably include a substantially airtight shell that is connected to the utility housing 280 by a conduit system 282. In such an application, the utility housing 280 can include well-known equipment for reducing noxious components of any gaseous emissions. One advantage of performing in situ soil vitrification in accordance with the present invention is that vitrification of contaminated soils and pyrolysis of toxic contaminants can be conducted at subsurface depths sufficient to allow condensation of noxious gases as they rise from the bottom of the borehole 272 and come into contact with the relatively cool walls of the borehole while existing the hole.

After the borehole has been formed and the support structure has been assembled at the site, the electrode assembly 275 is lowered into the borehole 272 as shown in FIG. 8A. Preferably, a non-transferred arc is struck and the arc is positioned at the lower tip of the electrode assembly as has been described in connection with FIGS. 2A–2C. If the soil at the bottom of the borehole is not sufficiently conductive for contact arc initiation, a starter material, which includes conductive constituents, may be introduced into the borehole prior to or during insertion of the electrode assembly into the borehole. The non-transferred arc can then be struck by contacting the tip of the electrode assembly with the conductive starter material.

Figure 8B:
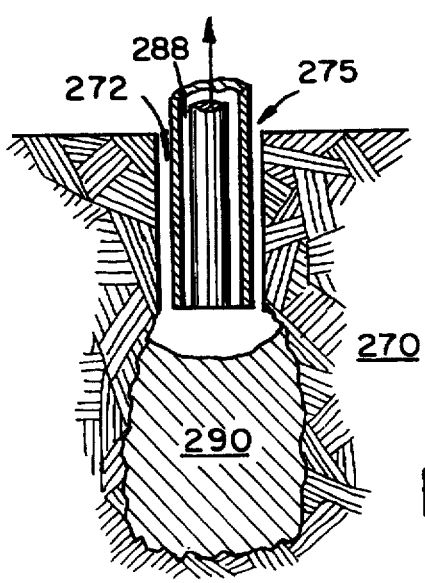

In operation, after the non-transferred arc has been established at the tip of the electrode assembly, a volume of soil 286 in the vicinity of the tip of the electrode assembly 275 may be heated to form a molten pool at the bottom of the borehole 272. Once the pool of molten material has been established, the electrode assembly 275 is slowly raised in the borehole 272 toward ground level by the winch 278 while the non-transferred arc is maintained between the electrodes of the electrode assembly. As can be seen in FIG. 8B, the raising of the operating electrode assembly 20 in the vertical direction toward ground level causes the soil adjacent to the borehole to melt and to converge into the borehole, thus forming a vitrified column 290 within the original borehole.

Depending upon the nature and composition of the soil 270, the vitrified column 290 may not adequately fill the borehole, so that it may be desirable to deposit additional filler material into the borehole 272 by dropping it through the annular cavity 288 between the inner and outer electrodes of the electrode assembly 20. Such filler material may be introduced into the annular cavity 28 in a manner similar to the particulate injection procedure discussed in connection with FIG. 2A. Of course, the filler material may be introduced into the borehole 272 in a variety of ways depending on the configuration of the borehole and the configuration of the electrode assembly. It should also be appreciated that the filler material may include various agents for altering the physical and/or chemical properties of the soil, such as its melting temperature, the viscosity of the molten soil, the conductivity of the melt, and the like.

For treatment of relatively isolated or limited areas of soil contamination, a single vitrified column formed within a borehole may suffice to remediate such limited areas of contamination. However, if the contamination is spread over a relatively large area, then in situ vitrification in accordance with the invention may be carried out by simultaneously operating electrodes in a plurality of adjacent boreholes in the contaminated area. By selecting a sufficiently close spacing between adjacent boreholes, the individual vitrified columns formed within adjacent boreholes may coalesce to form a composite subterranean mass of vitrified material over the area between the boreholes. To reduce the time required for such remediation in a relative large area, a system of a plurality of electrodes operating in adjacent boreholes to simultaneously vitrify the soil is shown in FIG. 9.

Figure 9:
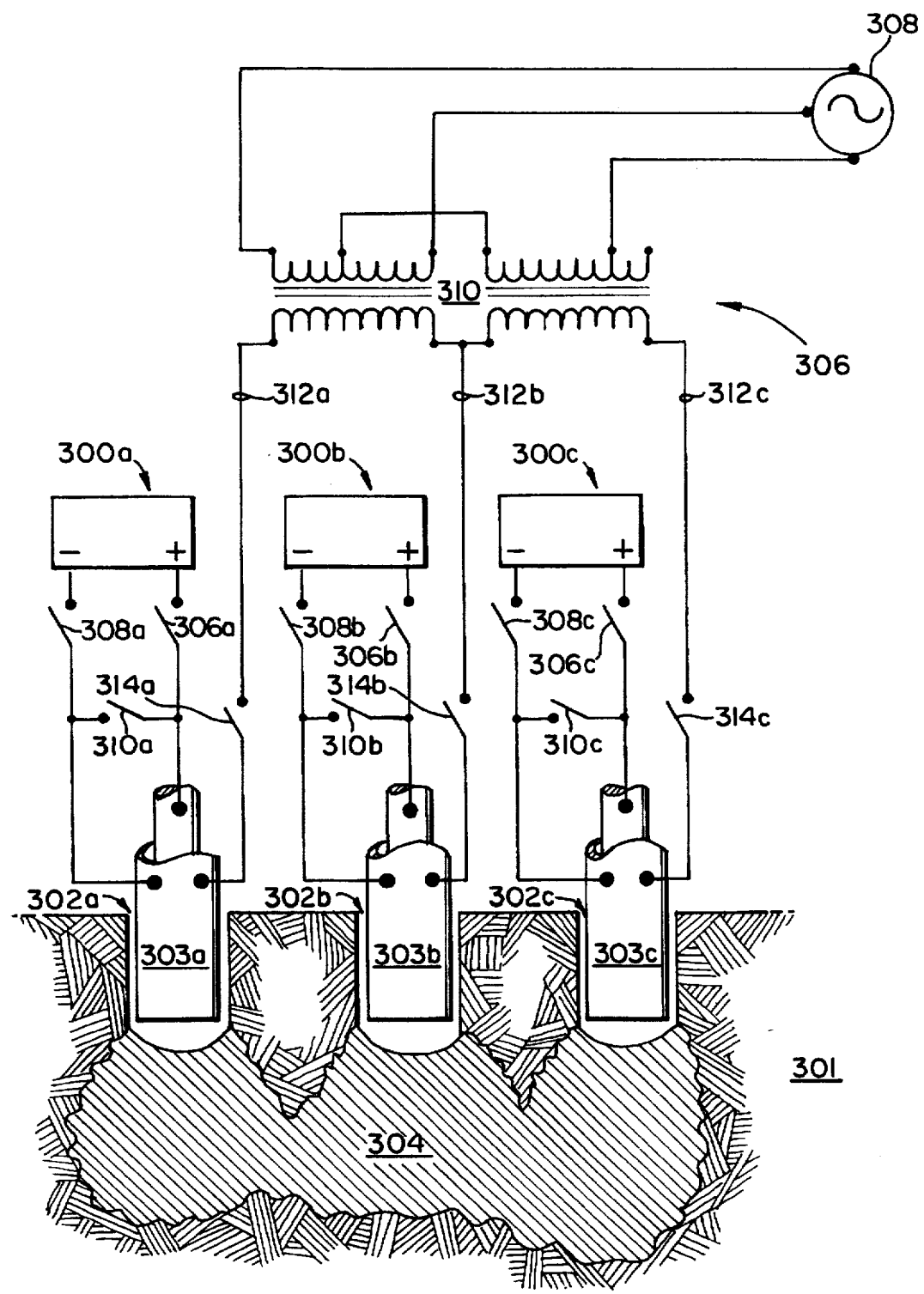
FIG. 9 is a partially schematic diagram of a system for operating a plurality of electrode assemblies at a remote site to produce a subterranean barrier.

In the arrangement of FIG. 9, it is desired to solidify the contaminated soil associated with each borehole or to create a subterranean vitrified mass or barrier around the area of contaminated soil to prevent migration of the contaminants through the barrier. Alternatively, such a subterranean barrier may be formed to surround an area of non-contaminated soil, in order to prevent migration of contaminants into the area of non-contaminated soil.

As shown in FIG. 9, adjacent boreholes generally designated 302a, 302b and 302c are formed in the ground 301. Electrode assemblies 303a, 303b and 303c are inserted into respective boreholes 302a, 302b and 302c in a manner as described in regard to FIG. 8A. Each of the electrode assemblies 303A–c is associated with an independent DC power supply 300a–c, respectively. The power supplies 300a–c are each connected with their respective electrode assemblies through switching networks that allow each electrode assembly to be operated in transferred and non-transferred modes as described previously in connection with FIGS. 1A–B.

After the electrode assemblies 303a–c are lowered into their respective boreholes 302a–c, their associated switches 308a–c and 306a–c are closed for preferably non-transferred operation of each of the electrode assemblies. Non-transferred operation is maintained for a sufficient amount of time to form a molten pool at the bottom of each of the boreholes 302a–c. The electrode assemblies 20a–c are then slowly withdrawn from the boreholes 302a–c while maintaining non-transferred operation in order to produce adjacent columns of vitrified material.

Depending on the distance of separation between the boreholes 302a–c, the individual columns may coalesce as the electrode assemblies are slowly withdrawn. Such coalescence of adjacent columns of molten material can be enhanced by operating the electrode assemblies 303a–c in the transferred mode.

The transferred mode of operation may be established by configuring the power supplies 300a–c such that the DC polarity of each electrode is reversed with respect to each adjacent electrode. Alternatively, a plurality of electrodes in adjacent boreholes may be operated in a DC non-transferred mode while AC potentials are applied between the outer electrodes of adjacent electrode assemblies so that material within each borehole is heated primarily by the non-transferred arc while material between adjacent boreholes is heated by the transferred AC current between electrode assemblies.

It should be appreciated that after the electrode assemblies 303a–c are lowered into the boreholes and have begun operating in a non-transferred mode for a sufficient period of time, the soil separating the boreholes may become heated and sufficiently conductive to allow transferred operation. Additionally, conductive material may be added to the molten pools in the boreholes to enhance conductivity between adjacent boreholes. When conduction has been established between adjacent boreholes, a transition to transferred operation may be made as follows. Switches 308a, 306b and 308c are opened and switches 310a, 310b and 310c are closed so that the inner and outer electrodes of electrode assemblies 303a and 303c are connected with a positive DC potential while the inner and outer electrodes of electrode assembly 303b are connected with a negative potential. A transferred arc will then be established between the interior surface of each borehole and the tip of each electrode assembly 303a, 303b and 303c. The transferred mode of operation established within each borehole will enhance the tendency of the vitrified material 304 formed in the boreholes to coalesce into a unitary or composite mass across the area treated by the system.

After transferred mode of arc operation has been established in each of the boreholes, the electrode assemblies are maintained in a transferred mode while being slowly raised within their respective boreholes. As indicated in FIG. 9, the above described operation of the system has been found to result in the coalescence of the fused columns formed within each of the boreholes to form a solid mass of vitrified material, designated 304.

As previously mentioned, an alternative method of promoting coalescence of adjacent columns of molten soil is carried out by maintaining a non-transferred DC mode of operation within each borehole while establishing an AC potential between the outer electrodes of the electrode assemblies within adjacent boreholes. In this arrangement, an AC power supply system 306 may be connected to the outer electrodes of each of the electrode assemblies 303a–c. As shown in FIG. 9, three-phase AC power is supplied from an AC power source 308 to the primary terminals of a three-phase to two-phase transformer assembly, such as a Scott-T connected transformer bank 310. The secondary terminals of the transformer 310 provide one two-phase AC potential between conductors 312a and 312b and another two-phase AC potential between conductors 312b and 312c. Conductors 312a, 312b and 312c are connected with the outer electrodes of electrode assemblies 303a–c, respectively, through switches 314a–c, respectively. The switches 314a–c are initially held open while the electrode assemblies 303a–c are lowered into their respective boreholes and the electrode assemblies are started in a DC non-transferred mode of operation, as previously described. After the electrodes 303a–c have begun to operate in a DC non-transferred mode, the switches 314a–c may be closed to establish AC conduction between adjacent boreholes in order to promote coalescence of the material therebetween.

Figure 10A:
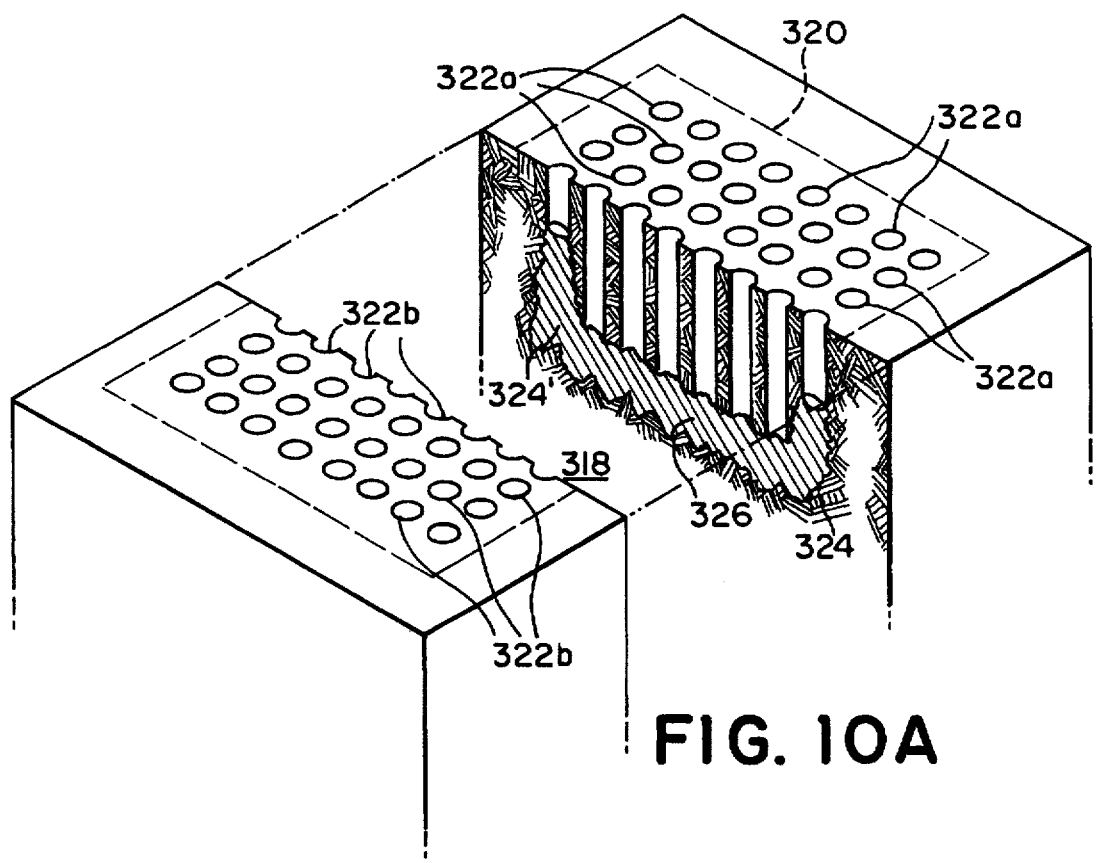
FIGS. 10A–B are cross-sectional views of alternative subterranean barrier structures that can be constructed using the system of FIG. 9.

The principles of operating the plurality of adjacent electrodes for in situ vitrification described in connection with FIG. 9 can be extended to an arbitrarily large number of electrodes and electrode configurations other than the concentric electrode configuration shown, may be employed, as would be apparent to those skilled in the art having read the disclosure herein. The ability to create an arbitrarily long subterranean barrier of fused vitrified columns facilitates the construction of subterranean containment. Also, subterranean contaminants can be formed to encircle contaminated areas and to prevent migration or leaching beyond the barriers by such subterranean containments. A subterranean containment is indicated as having been formed in FIG. 10A. As shown in FIG. 10A, contaminated soil is located beneath an area 320 of the surface. A plurality of boreholes 322a are indicated as having been drilled into the ground 318 about the perimeter of contaminated area 320. Electrode assemblies (not shown) may be operated within the perimeter boreholes 322a in order to form vertical barriers, such as walls 324 and 324' of fused, vitrified soil columns. These fused columns prevent contaminants from migrating beyond the boundary defined by the columns. The depth of the boreholes 322a preferably extends into the ground 318 below the depth at which the contamination has been determined to extend. The boreholes 322a may extend significantly deep relative to the contamination to reach a suitably stable subterranean geological formation capable of preventing the contaminating material from migrating outward beneath the vertical barriers 324, 324'.

Alternatively, an additional set of boreholes 322b may be formed within the area 320 in an array such that the entire area 320 is perforated by boreholes extending into the ground 318. Electrode systems (not shown) may be operated within the interior boreholes 322b so that molten pools of material at the bottom of the boreholes 322b may be fused together to form a bottom barrier 326. The bottom barrier designated 326 may be formed before, after or during the formation of the vertical barriers 324 and 324', so that the vertical barriers 324, 324' are fused with the bottom barrier 326, thus forming a subterranean containment structure in the shape of a vessel. If it is desired to completely transform the contaminants within the soil into a complete vitrified mass, rather than simply containing the contaminated area, the electrodes inserted into the interior boreholes 322b may be operated during the entire withdrawal operation that the soil is fused into a single solid vitrified block.

Figure 10B:
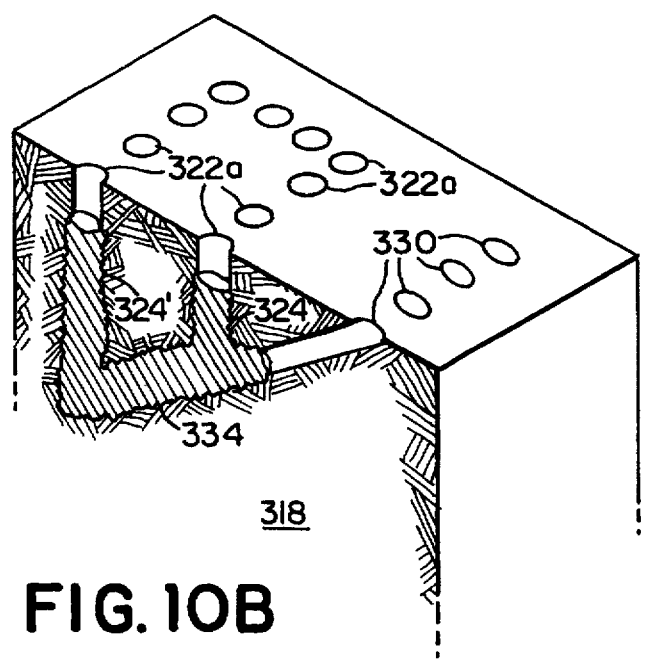

In the event that it is desired to reduce the number of boreholes in forming an underground containment for contaminated soil, an alternative borehole strategy may be employed, such as indicated in FIG. 10B. In this arrangement, boreholes 322a are drilled into the soil 318 about the periphery of the contaminated area in order to form peripheral barrier walls 324 and 324' surrounding the contaminated area. A bottom 334 connecting the peripheral barrier walls may be formed by employing a series of boreholes 330 drilled on a slant into the ground 318 beginning at a location outside of the perimeter of the contaminated area. The boreholes 330 are drilled in such a way as to have a horizontal extending component, so that the holes extend diagonally down beneath the barrier walls. Electrodes may then be inserted into the diagonally extending boreholes 330 and operated as previously described to form the bottom barrier 334 of the containment, which, when completed, is in the form of a vessel.

It is should be appreciated that the methods of producing a vitrified subterranean formation, such those disclosed above, will find wide use in various applications in addition to containment of waste material. For example, such methods can be employed in the construction industry to provide a sound footing or foundation pilings at locations where the soil is not mechanically competent or sufficiently stable to provide suitable footing for supporting structures.

In regard to a construction application for the invention, there is shown in FIG. 11A a region of soil 400 into which a borehole 402 is formed. An electrode assembly 404, in accordance with the invention, is inserted into the borehole 402 and is suspended therein by a suitable support member 406. The support member 406 includes means for supplying electrical power and cooling water to the electrode assembly 404 as previously described above in regard to other embodiments of the invention. The support member 406 is connected with a suitable hoist (not shown) for raising and/or lowering the electrode assembly 404 within the borehole.

The electrode assembly 404 is lowered into the borehole 402 until it is adjacent to the bottom of the borehole 402. Then the electrode assembly 404 is energized to vitrify the soil at or near the bottom of the borehole forming a vitrified mass 408. The electrode assembly 404 may be raised within the borehole 402 during formation of the vitrified mass 408 in order to increase the vertical extent of the vitrified material. Additional materials, such as clay or other glass-forming substances, can be introduced into the borehole prior to, or during, the vitrification process 404. The use of such additional materials is particularly desirable for practicing the method in soil which is unsuitable for forming a mechanically competent base for supporting pilings.

After the vitrified mass 408 has been formed at or near the bottom of the borehole 402, the electrode assembly 404 is removed from the borehole. Then, as shown in FIG. 11B, a piling 414 is driven into the borehole until it contacts and adequately anchored to the vitrified mass 408. If the piling 414 has a diameter that is smaller than the original borehole, filler material 412 can be introduced into the annular space 410 between the exterior of the piling 414 and the interior of the borehole in order to provide lateral support for the piling 414.

In loose soil, or in soil that is otherwise not suitable for maintaining a vertical borehole, it may be desirable to provide a mechanical support column during formation of the vitrified mass at the bottom of the hole. Referring now to FIG. 12, there is shown a region of soil 416 in which a borehole 418 has been formed. A mechanical support, such as a metallic sheath 420, is inserted into the borehole in order to provide a working shaft for electrode assembly 422. The metallic sheath 420 may comprise one or more connected tubular segments that can be raised or lowered within the borehole using standard techniques known in the drilling art. The electrode assembly 422 is suspended within the metallic sheath 420 and is supplied with electrical power and cooling water through a conduit in support member 424.

After the electrode assembly 422 has been positioned adjacent to the bottom of the borehole, the electrode assembly is operated to vitrify the soil at or near the bottom of the borehole. Additional glass-forming material, such as clay, can be added to the borehole prior to, or during, the vitrification process. After vitrification is accomplished, the electrode assembly is removed from the hole. The metallic sheath may also be removed from the hole. A piling (not shown) can then be driven into the hole. Alternatively, the metallic sheath may remain in the hole in order to provide further lateral support for the piling.

If additional lateral support is desired, the metallic sheath 420 can be used to vitrify the surrounding exterior of the borehole. If such vitrification is desired, one terminal of the power supply 428 is connected to the metallic sheath 420. The other terminal of the power supply is connected, by an earth electrode 430, to the adjacent soil 416. When power is supplied to this connection, the soil in the vicinity of the metallic sheath is vitrified. If desired, additional glass forming material can be inserted into the annular space 429 between the metallic sheath and the interior of the borehole prior to operating the power supply 428.

To provide an extensive subterranean support for piling construction, multiple vitrification systems can be operated to form an extensive support arrangement in accordance with the principles discussed in connection with FIG. 9 and FIGS. 10A and 10B. In embodiments wherein metallic supporting sheaths are employed, an electrical potential can be applied across adjacent metallic sheaths in order to vitrify the soil therebetween.

In summary in regard to the inventive concepts herein, the terms and expressions, which have been employed, are used as terms of description and not of limitation. There is no intention in the use of such terms and expressions of excluding any equivalents of the features shown and described, or portions thereof. From the above description, it will be appreciated that the invention herein may be embodied in a large variety of forms different from the ones specifically shown and described without departing from the scope and spirit of the inventive concepts as defined by the appended claims.

We claim:

1. A method of igniting an electric arc between a pair of concentric electrodes which is formed by an inner electrode and an outer electrode surrounding the inner electrode and providing a cavity therebetween, the method comprising:

injecting conductive particulate material into the cavity; and applying an electrical voltage across the inner and outer electrodes.

2. The method of claim 1 wherein said injecting step comprises injecting the particulate material into said cavity in connection with a compressed gas.

3. The method of claim 2, further comprising injecting said particulate material through a bore within said inner electrode and into said cavity.

4. The method of claim 3 wherein said particulate material is injected prior to said applying step.

5. The method of claim 4 further comprising the step of delaying said applying step after said injecting step for an interval of time sufficient to allow said conductive particulate material to assume a desired position within the cavity.

6. The method of claim 5 wherein said injecting step comprises the step of urging a defined quantity of conductive particulate material into the cavity under the influence of pressurized gas.

7. The method of claim 5 comprising the step of positioning the electrodes within an arc furnace in proximity to waste material to be treated therein.

8. The method of claim 5 comprising the step of positioning the electrodes into a hole formed in soil prior to said injecting step.

9. The method of claim 2 wherein said injecting step comprises transmitting a quantity of particulate material through an electrically insulating conduit.

10. The method of claim 2 wherein each of said electrodes has respective upper and lower portions, said injecting step comprises injecting said particulate material into the upper portion of the cavity, and further comprising the step of delaying said applying step for a period of time sufficient for the injected particulate material to reach the lower portion of the cavity.

11. The method of claim 2 wherein said injecting step comprises injecting nonmetallic particulate material.

12. The method of claim 11 wherein said injecting step comprises the step of injecting particulate graphite.

13. The method of claim 12 wherein said applying step comprises the step of applying a DC voltage.

14. The method of claim 1 comprising a step of positioning the electrodes within an arc furnace in proximity to waste material to be treated therein.

15. The method of claim 1 comprising the step of positioning the electrodes into a hole formed in soil prior to said injecting step.

16. An electrode assembly, comprising:

a first electrode comprising a hollow cylinder having an upper end and a lower end;

a second electrode comprising a cylinder having an upper end and a lower end and positioned coaxially within said first electrode, said first and second electrodes having an annular cavity therebetween; and said second electrode having a conduit formed therein for transporting conductive material into said annular cavity.

17. The electrode assembly of claim 16 comprising clamping means for retaining said first and second electrodes in coaxial alignment.

18. The electrode assembly of claim 16 wherein said first and second electrodes each comprises a graphite electrode.

19. The electrode assembly of claim 18 wherein said first and second electrodes each comprises separable upper and lower segments.

20. The electrode assembly of claim 19 wherein the lower segment of the second electrode comprises a solid graphite member.

21. An electrode assembly, comprising:

a first electrode comprising a hollow cylinder having an upper end and a lower end;

a second electrode comprising a cylinder having an upper end and a lower end and positioned coaxially within said first electrode, said first and second electrodes having an annular cavity therebetween; and said second electrode having a conduit formed therein for transporting conductive material into said annular cavity, wherein each of said first and second electrodes comprises two separable segments corresponding to the upper end and the lower end of each electrode, whereby the lower end of each electrode is replaceable upon deterioration.

22. An electrode assembly, comprising:

a first electrode comprising a hollow cylinder having an upper end and a lower end;

a second electrode comprising a cylinder having an upper end and a lower end and positioned coaxially within said first electrode, said first and second electrodes having an annular cavity therebetween, and the upper end of said second electrode extending axially outward of the upper end of said first electrode;

said second electrode having a conduit formed therein for transporting conductive material into said annular cavity;

first holding means for retaining the upper end of said first electrode;

second holding means for retaining the upper end of said second electrode; and a rigid insulator connected between said first and second holding means for positioning said first and second holding means to retain said first and second electrodes in alignment and electrically isolated.

23. The electrode assembly of claim 22 wherein said first and second holding means comprise electrical connection means for connecting said first and second electrodes with a source of electricity.

24. The electrode assembly of claim 22 wherein said first and second holding means comprise respective first and second annular clamps, and wherein said insulator comprises a disc positioned between said first and second annular clamps and encircling the upper end of said second electrode.

25. The electrode assembly of claim 24 wherein said first and second annular clamps include conduits for circulating coolant therein.

* * * * *